United States Patent [19]

Otsuka et al.

[11] Patent Number: 5,188,070
[45] Date of Patent: Feb. 23, 1993

[54] SYSTEM FOR STARTING AN INTERNAL COMBUSTION ENGINE FOR POWERING VEHICLES

[75] Inventors: Masuhiro Otsuka; Hiromi Kohno, both of Higashimatsuyama, Japan

[73] Assignee: Zexel Corporation, Tokyo, Japan

[21] Appl. No.: 757,000

[22] Filed: Sep. 10, 1991

[30] Foreign Application Priority Data

Sep. 11, 1990 [JP] Japan .................................. 2-240641

[51] Int. Cl.$^5$ .............................................. F02N 11/10
[52] U.S. Cl. .................................. 123/179.23; 74/850
[58] Field of Search ............. 123/179.23, 179.3, 179.4; 74/850

[56] References Cited

U.S. PATENT DOCUMENTS

| | | | |
|---|---|---|---|
| 2,685,651 | 8/1954 | Collins | 123/179.3 |
| 2,757,295 | 7/1956 | Briggs | 123/179.3 |
| 3,574,288 | 4/1971 | Barth et al. | 123/179.23 |
| 4,454,789 | 6/1984 | Kaspar et al. | 123/179.23 |

FOREIGN PATENT DOCUMENTS 60-248443 12/1985 Japan .

*Primary Examiner*—Andrew M. Dolinar
*Attorney, Agent, or Firm*—Pollock, Vande Sande & Priddy

[57] ABSTRACT

In an engine starting system for a vehicle with an automatic transmission system including a clutch operated by an actuator, the system comprises a detector for detecting whether an engine has stalled for a reason other than that an ignition switch has been turned off, and a control signal for disengaging the clutch is supplied to the actuator when the ignition switch is turned to its start position in the case where it is detected by the detector that the engine has stalled. After this, the current necessary for activating the starter motor is supplied to the starter motor irrespective of the position selected by a selector whenever the ignition switch is turned to the start position. The clutch needs not necessary be disengaged and it is possible to drive the starter motor with the clutch engaged.

7 Claims, 5 Drawing Sheets

SYSTEM FOR STARTING AN INTERNAL COMBUSTION ENGINE FOR POWERING VEHICLES

BACKGROUND OF THE INVENTION

1. Field of the Invention

The present invention relates to a system for starting an internal combustion engine for powering a vehicle having an automatic transmission system, which is capable of starting the engine without complicated operations.

2. Description of the Prior Art

In general, conventional vehicles with automatic transmission systems are arranged to allow the internal combustion engine to start only when the range selecting lever of a selector is positioned at either the neutral or park position. Consequently, to restart the engine and get the vehicle moving again in the case where the engine has stalled when, for example, the vehicle is in the middle of a railroad crossing, the driver has to turn the ignition switch to the start position after returning the range selecting lever to either the neutral or park position, and further has to move the selecting lever to, for example, the drive position. The driver thus has to perform complicated and time-consuming operations, so that there is risk that the restarting of the engine may be delayed. This is particularly a problem in an emergency of the type just referred to since the delay in restarting the engine may result in a serious accident.

To overcome the aforesaid disadvantage, Japanese Patent Application Public Disclosure No. Sho 60-248443 proposes an engine starting system which is capable of starting the engine even with the selecting lever is shifted to a position at which the operation for starting the engine is normally inhibited, so long as the brake pedal is depressed.

However, in an emergency such as mentioned above, the driver may become so excited that he forgets to depress the brake pedal, so that there is still a possibility of the engine starting operation being delayed. Thus, an engine starting system for vehicles which allows the engine to be started more simply is needed.

SUMMARY OF THE INVENTION

It is an object of the present invention to provide an improved system which enables the internal combustion engine of a vehicle with an automatic transmission system to be started more simply.

It is another object of the present invention to provide a system for starting the internal combustion engine of a vehicle with an automatic transmission system, which is capable of starting the engine by simply operating the ignition switch.

It is a further object of the present invention to provide an engine starting system for a vehicle with an automatic transmission system, which is capable of moving the vehicle during the engine starting operation.

According to the present invention, in an engine starting system for a vehicle with an automatic transmission system which has a clutch engaged/disengaged by use of an actuator and operates in an automatic gear-shifting mode selected by a selector, the system comprises a starter motor; detecting means for detecting whether the engine has stalled for a reason other than that the ignition switch has been turned off; disengagement control means for supplying a disengagement control signal for disengaging the clutch to the actuator when the ignition switch is turned to its start position in the case where it is detected by the detecting means that the engine has stalled; disengagement detecting means for detecting that the clutch has been disengaged; and means responsive to the disengagement control means and the disengagement detecting means for providing the current necessary for activating the starter motor only when the clutch is disengaged in response to the disengagement control signal and the ignition switch is switched to the start position. Thus, when the driver turns the ignition switch to the start position in the case where the engine has stalled, the clutch is controlled to be disengaged in response to the disengagement control signal. After it is detected by the disengagement detecting means that the clutch has been disengaged, the current necessary for activating the starter motor is supplied to the starter motor irrespective of the position selected by the selector whenever the ignition switch is turned to the start position.

According to another feature of the present invention, in an engine starting system for a vehicle with an automatic transmission system which has a clutch engaged/disengaged by the use of an actuator and operates in an automatic gear-shifting mode selected by the selector, the system comprises a starter motor; detecting means for detecting whether the engine has stalled for a reason other than that the ignition switch has been turned off; engagement control means for supplying an engagement control signal for engaging the clutch to the actuator when the ignition switch is turned to its start position in the case where it is detected by the detecting means that the engine has stalled; engagement detecting means for detecting that the clutch has been engaged; and means responsive to the engagement control means and the engagement detecting means for providing the current necessary for activating the starter motor only when the clutch is engaged in response to the engagement control signal and the ignition switch is switched to the start position. Thus, when the driver turns the ignition switch to the start position in the case where the engine has stalled, the clutch is controlled to be engaged in response to the engagement control signal. After it is detected by the engagement detecting means that the clutch has been engaged, the current necessary for activating the starter motor is supplied to the starter motor irrespective of the position selected by the selector whenever the ignition switch is turned to the start position. Thus, the vehicle is enabled to run by the rotational torque of the starter motor while the engine starting operation is being carried out.

The invention will be better understood and other objects and advantages thereof will be more apparent from the following detailed description of preferred embodiments with reference to the accompanying drawings.

DESCRIPTION OF THE PREFERRED EMBODIMENTS

Figure 1:
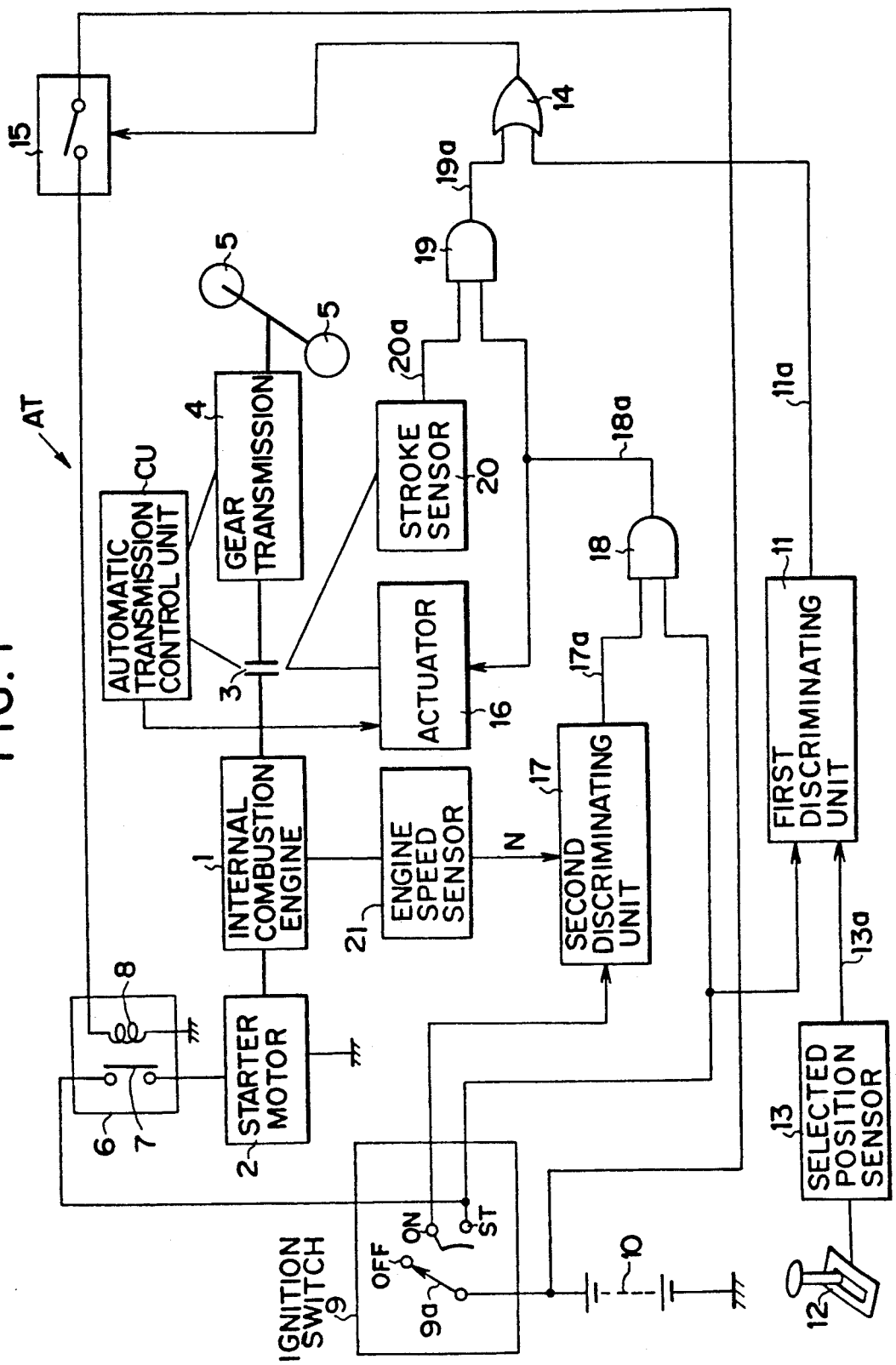
FIG. 1 is a schematic view illustrating an embodiment of the present invention.

FIG. 1 is a schematic view of a control system for a vehicle powered by an internal combustion engine 1, whose starting operation is controlled by an engine starting system according to the present invention. The rotational output power of the internal combustion engine 1 coupled with a starter motor 2 is transmitted through a clutch 3 and a gear transmission 4 to driving wheels 5. The clutch 3 and the transmission 4 are associated with an automatic gear-shifting control unit CU to form a conventional electronically controlled type automatic gear-shifting control system AT.

One terminal of the starter motor 2 is grounded, and the other terminal is connected through a relay switch 7 of a relay 6 with a start position contact ST of an ignition switch 9, which is of well-known design. A movable contact 9a of the ignition switch 9 is connected with the positive terminal of a battery 10 whose negative terminal is grounded. Accordingly, if an exciting current is passed through a relay coil 8 of the relay 6 in a way described later when the ignition key 9 is in the start position, a starting current will be supplied through the relay switch 7 to the starter motor 2 to start the engine 1.

Reference numeral 11 designates a first discriminating unit for discriminating whether or not prescribed preconditions for starting the engine under normal driving circumstances are satisfied. The potential appearing at the start position contact ST of the ignition switch 9 is applied to the first discriminating unit 11. Reference numeral 13 designates a selected position sensor for producing a high level detection signal on its output line 13a when a selector 12 is set in the neutral range. The output line 13a is connected with the first discriminating unit 11.

The first discriminating unit 11 judges that the preconditions for starting the engine are satisfied when the potential at the contact ST and the potential on the output line 13a have become high at the same time. Specifically, when the selector 12 is in the neutral position and the ignition switch 9 is in the start position, the level of the output line 11a of the first discriminating unit 11 becomes high.

The output line 11a is connected with the input terminal of an OR gate 14 whose output signal is applied as an opening/closing control signal to a switch 15 connected between the relay coil 8 and the positive terminal of the battery 10.

In brief, when the first discriminating unit 11 discriminates that the preconditions for starting are satisfied, the output level of the OR gate 14 becomes high to close the switch 15. Then, the relay switch 7 closes in response to the closing of the switch 15 to allow the current to flow to the starter motor 2, whereby the starting operation of the engine 1 is carried out.

In addition, in the operations described above, the automatic transmission control unit CU controls an actuator 16 connected with the clutch 3 for disengaging the clutch so that the rotational output of the engine 1 will not be transmitted to the transmission 4.

A description will now be given to a control system for starting the engine 1 in the case where the rotation of the engine 1 has stopped for some reason after once started, in other words, in the case where the engine has stalled.

Reference numeral 17 designates a second discriminating unit for discriminating whether or not the engine 1 has stalled, based on a rotation signal N indicating the rotational speed of the engine 1 generated by an engine speed sensor 21 and the potential at the ON position contact of the ignition switch 9.

The second discriminating unit 17 discriminates whether or not the engine has stalled in a conventional manner, as by discriminating whether or not the rotational speed of the engine 1 has decreased to zero while the ignition switch 9 is in the ON position. When it is discriminated that the engine has stalled, the output line 17a of the second discriminating unit 17 rises from low to high level, and is maintained at high level.

The ST contact of the ignition switch 9 is connected with one terminal of an AND gate 18 whose other terminal is connected with the output line 17a. The output line 18a of the AND gate 18 is connected with both the actuator 16 and one terminal of another AND gate 19.

The other terminal of the AND gate 19 is connected with the output line 20a of a stroke sensor 20 which is coupled with the clutch 3. The stroke sensor 20 produces a high level signal when the clutch 3 is disengaged. Accordingly, when the level of the output line 18a has become high and the clutch 3 is disengaged by the actuator 16, both inputs to the AND gate 19 become high level, causing the output line 19a of the AND gate 19 to become high level.

The output line 19a of the AND gate 19 is connected with one terminal of the OR gate 14 whose output level becomes high to close the switch 15 when the output line of the AND gate 19 becomes high, even though the level of the output line 11a is low.

According to this arrangement, when the engine 1 stalls while the vehicle is running, simply turning the ignition switch 9 to the start position makes the level of the output line 18a of the AND gate 18 become high. As a result, the clutch 3 is automatically disengaged and the switch 15 is closed when the disengagement of the clutch 3 is confirmed by the stroke sensor 20. As a result, starting current is supplied from the battery 10 to the starter motor 2 through the ignition switch 9 and the relay switch 7, whereby the engine 1 is restarted.

Thus, when the engine stalls while the vehicle is running, it can be restarted simply by turning the ignition switch 9 to the start position for supplying starting current to the starter motor 2. This operation is simple enough to enable the driver to restart the engine 1 quickly and reliably even in an emergency.

Figure 2:
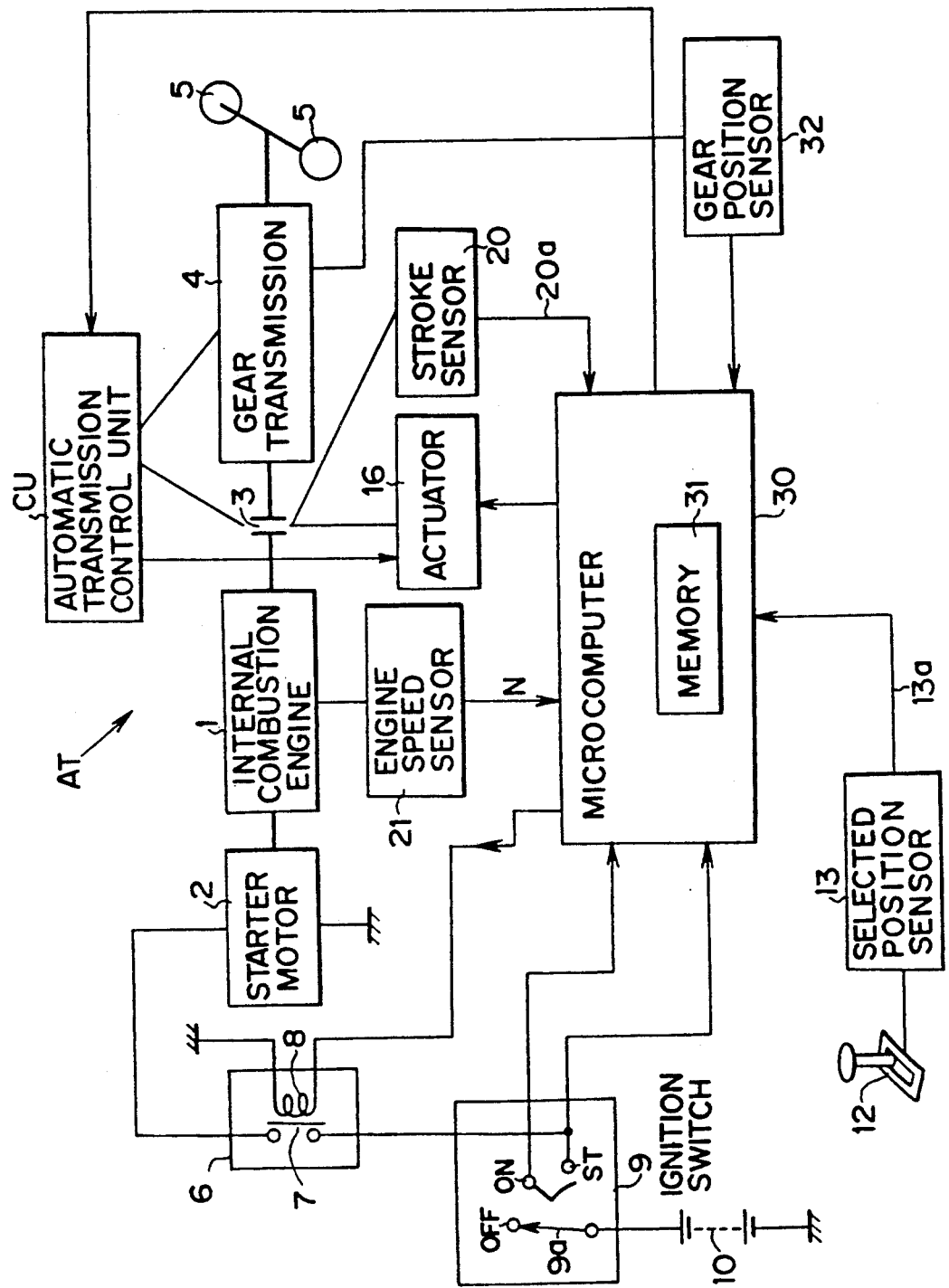
FIG. 2 is a schematic view illustrating another embodiment of the present invention, in which a microcomputer is employed.

A system able to perform the same function as the arrangement illustrated in FIG. 1 can be realized by employing a microcomputer in an arrangement such as that shown in FIG. 2.

In FIG. 2, reference numeral 30 designates a microcomputer of well-known design, and 32 a gear position sensor for detecting the gear position of a gear transmission 4. The other components are the same as those shown in FIG. 1, and therefore, are assigned the same reference numbers and are not described further here.

The microcomputer 30 includes a memory 31 storing a control program 40, a flowchart of which is illustrated in FIG. 3, in order to realize the same control function as that of the embodiment shown in FIG. 1. By repeating the execution of the control program 40 at predetermined intervals, a prescribed engine starting control is carried out.

Figure 3A:
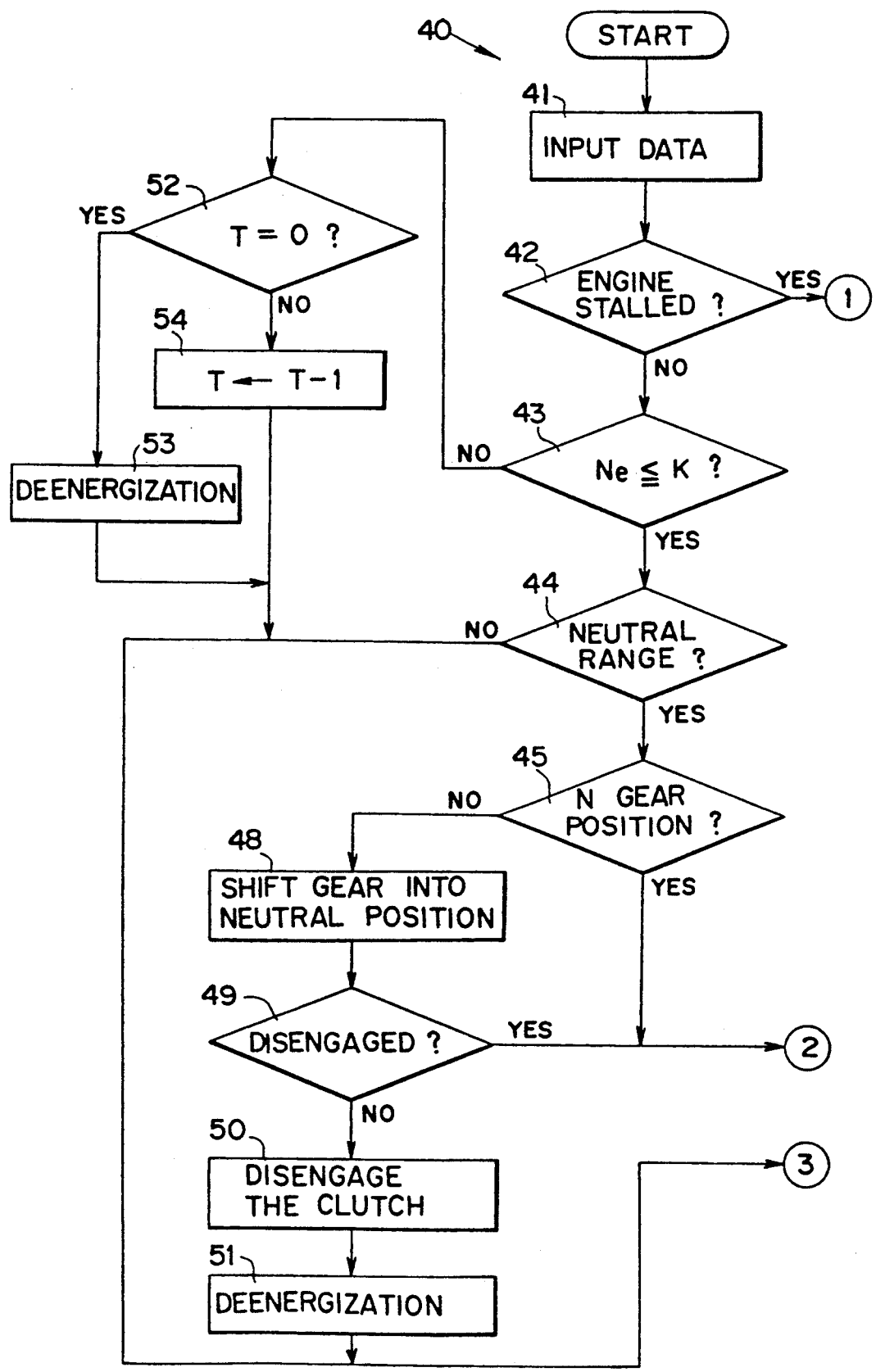
FIG. 3A is part of a flowchart showing the control program executed by the microcomputer shown in FIG. 2.
Figure 3B:
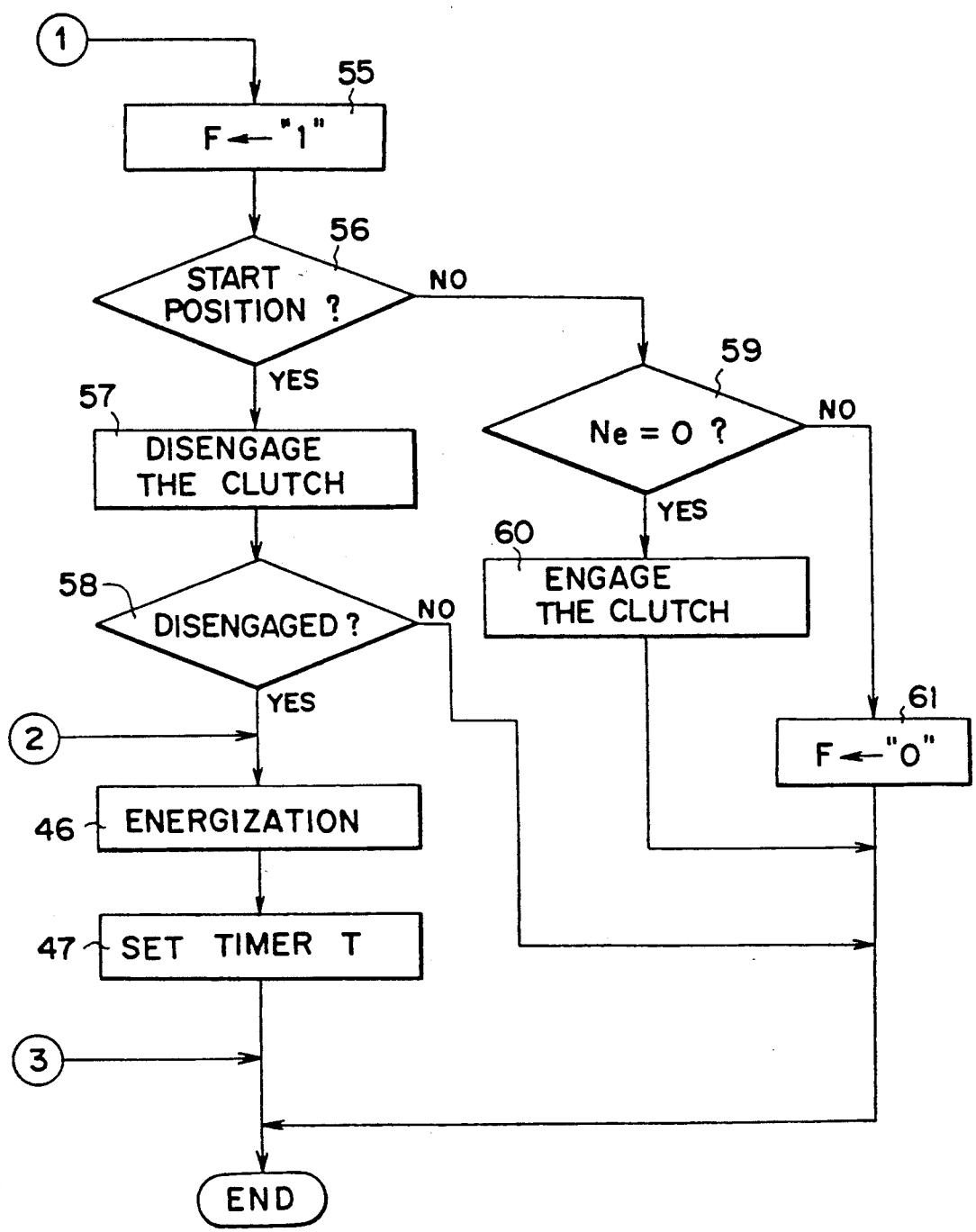
FIG. 3B is the remaining part of the flowchart showing the control program executed by the microcomputer shown in FIG. 2.

The control program 40 will be described with reference to FIGS. 3A and 3B.

Firstly, in step 41, data from the respective sensors and the potential data of the contacts of the ignition switch 9 are input to be stored in the memory 31. Then in step 42, discrimination is made as to whether or not the engine 1 has stalled. This discrimination can be made by the conventional method on the basis of the rotational signal N and the current position of the ignition switch 9.

When it is found that the engine has not stalled in step 42, the operation moves to step 43, where the rotational speed Ne of the engine 1 is compared with a prescribed value K. When it is found that Ne is equal to or smaller than K in step 43, the result of the discrimination is YES, and the operation moves to step 44. In step 44, it is discriminated whether or not the selector 12 is in neutral. If the result of the discrimination in step 44 is NO, the execution of the control program 40 is terminated.

If the result of the discrimination in step 44 is YES, the operation moves to step 45, where it is discriminated whether or not the gear transmission 4 is in neutral. If the gear transmission 4 is in neutral (N), the result of the discrimination in step 45 is YES, and in step 46, the energizing current is supplied to the relay coil 8 of the relay 6 to close the relay switch 7. As a result, engine starting current flows through the starter motor 2 when the ignition switch 9 is turned to the ST contact. In the next step 47, a timer T is set, and the program 40 is terminated.

In step 45, if it is found that the gear transmission 4 is in a position other than neutral, the result of the discrimination is NO, and in step 48, a command for shifting the gear transmission 4 into neutral is applied to the automatic transmission control unit CU. The operation then moves to step 49, where it is discriminated whether the clutch 3 is disengaged. When it is found that the clutch 3 is disengaged, the operation moves to step 46. On the other hand, when it is found in step 49 that the clutch 3 is engaged, the clutch 3 is disengaged in step 50 and after that in step 51, the relay switch 7 is opened to deenergize the rely 6. The program 40 is then terminated.

Now description will be given to the case where the rotational speed Ne is found to be greater than the predetermined value K in step 43.

In this case, the operation moves to step 52, where it is discriminated whether or not the timer T content is zero. If it is zero, the relay 6 is deenergized in step 53. On the other hand, if the timer T content is not zero, it is decreased by one in step 54. The execution of this program ends after step 53 or 54 is carried out.

When it is discriminated that the engine has stalled in step 42, the operation moves to step 55, where a flag F, indicating that the engine has stalled, is set. Then in step 56, it is discriminated whether or not the ignition switch 9 is at the contact ST. If it is found that the ignition switch 9 is at the contact ST, the clutch 3 is disengaged in step 57. After disengagement of the clutch 3 is confirmed in step 58, the operation moves to step 46. If it is found in step 58 that the clutch 3 is engaged, the execution of the program is terminated.

In step 56, if it is found that the ignition switch 9 is at a position other than the contact ST, the operation moves step 59, where discrimination is made as to whether or not the rotational speed Ne of the engine 1 is zero. If it is found that the rotational speed Ne is zero, the clutch 3 is engaged in step 60. If Ne is not zero, the flag F is cleared in step 61. The execution of the program 40 is completed with termination of the step 60 or 61.

As execution of the control program 40 just described is repeated at predetermined intervals, when the engine stalls, it can be restarted simply by turning the ignition switch 9 to the start position contact ST. That is, when the ignition switch 9 is switched to the contact ST, the clutch 3 is disengaged in steps 56 and 57. After the disengagement of the clutch 3 is confirmed in step 58, the relay 6 operates to close the relay switch 7, and the starter motor 2 is driven to start the engine 1.

In the embodiment described above, the clutch 3 is disengaged when the ignition switch 9 is switched to the contact ST. However, the clutch 3 need not necessary be disengaged and it is possible to drive the starter motor 2 with the clutch 2 engaged.

Figure 4:
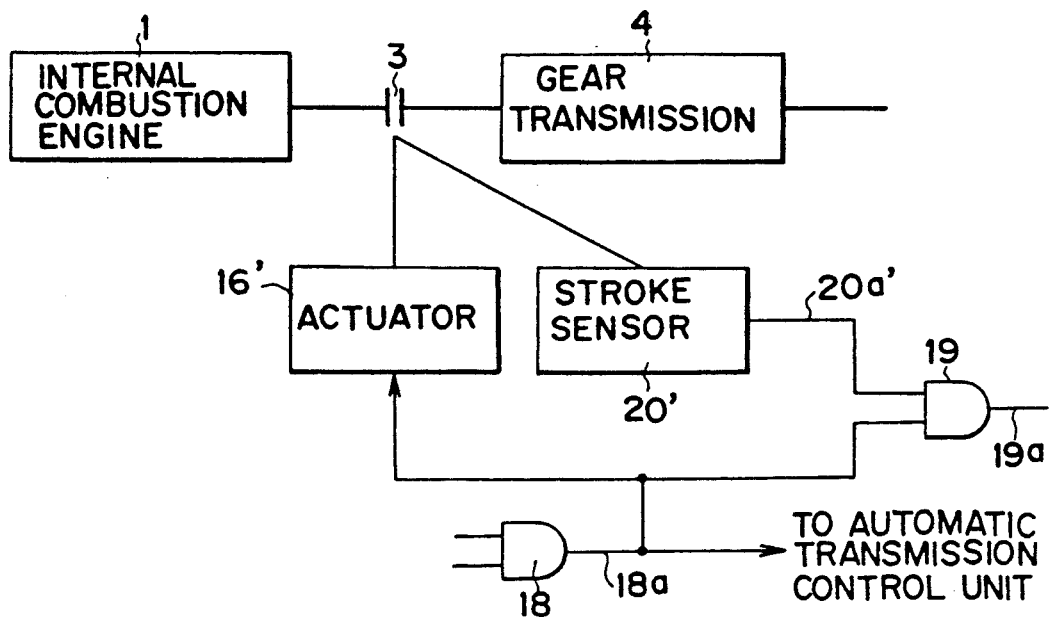
FIG. 4 is a block diagram illustrating a modified portion of the arrangement shown in FIG. 1.

In this case, the arrangement of the actuator 16 and stroke sensor 20 in FIG. 1 is changed to that shown in FIG. 4.

As shown in FIG. 4, the clutch 3 is connected with an actuator 16' for engaging the clutch 3 in response to a change in the level of output line 18a from low to high, and with a stroke sensor 20' whose output line 20a' becomes high level when the clutch 3 is engaged. The output lines 18a and 20a' are connected with respective input terminals of the AND gate 19 and the gear of the transmission 4 is shifted into the first speed position when the output line 18a becomes high level.

According to this arrangement, when the engine has stalled, the operation of switching over the ignition switch 9 to the start position contact ST causes the level of the output line 18a to become high, and the clutch 3 is engaged by the actuator 16' after the gear of the transmission 4 is shifted into the first speed position. When the clutch 3 is engaged, a high level signal is generated on the output line 20a' by the stroke sensor 20, whereby the output from the AND gate 19 becomes high level, and the relay 6 is actuated.

Consequently, the engine 1 is rotated by the starter motor 2 and the rotational power of the starter motor 2 is transmitted to the driving wheels 5 through the clutch 3 and the transmission 4, which is in the first speed position. Thus, it is possible to start the engine 1 while moving the vehicle by the power of the starter motor 2. This arrangement is extremely effective when, for example, the engine stalls while the vehicle is in the middle of a railway crossing.

Figure 5:
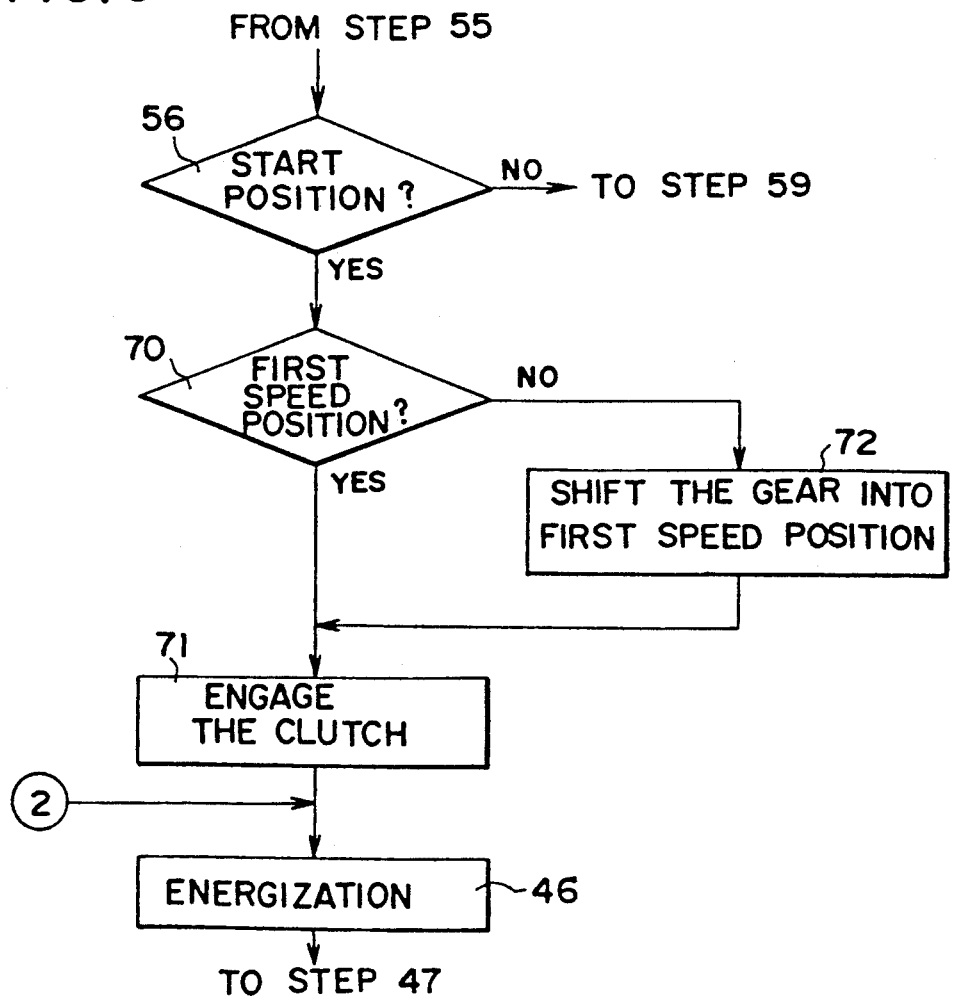
FIG. 5 is a flowchart illustrated a modified portion of the flowchart shown in FIG. 3B.

The function according to the arrangement shown in FIG. 4 can also be realized using the arrangement shown in FIG. 2 by replacing steps 57 and 58 of the program 40 shown in FIG. 3 with steps 70 to 72 shown in FIG. 5.

Referring to the flowchart in FIG. 5, if the result of the discrimination in step 56 is YES, whether or not the gear transmission 4 is in first gear is discriminated in step 70. Then, if the result of the discrimination is NO, the transmission 4 is shifted into the first speed position in step 72, and the clutch 3 is engaged in step 71 and the relay 6 is energized in step 46.

According to the arrangement described above, when the engine has stalled, switching of the ignition switch 9 to the start position contact ST causes the transmission 4 to be shifted into the first speed position if it is not already there. Then, the clutch 3 is engaged and the starter motor 2 is driven. The effect of this arrangement is the same as that of the arrangement explained earlier with reference to FIG. 4.

What is claimed is:

1. A system for starting an internal combustion engine powering a vehicle with an automatic transmission system which has a clutch engaged/disengaged by the use of an actuator and operates in an automatic gear-shifting mode selected by a selector, said system comprising:
   a starter motor;
   detecting means for detecting whether the engine has stalled for a reason other than that an ignition switch has been turned off;
   disengagement control means for supplying a disengagement control signal for disengaging the clutch to the actuator when the ignition switch is turned to its start position in the case where it is detected by said detecting means that the engine has stalled;
   disengagement detecting means for detecting that the clutch has been disengaged; and
   current control means responsive to said disengagement control means and said disengagement detecting means for providing a start current for activating said starter motor only when the clutch is disengaged in response to the disengagement control signal and the ignition switch is switched to the start position.

2. A system as claimed in claim 1, wherein said detecting means has a speed sensor for detecting a rotational speed of the engine and means responsive to the speed sensor and the potential at an ON position contact of the ignition switch for detecting whether the engine has stalled irrespective of the ignition switch being turned to the ON position, whereby it is discriminated whether the engine has stalled for a reason other than that the ignition switch has been turned off.

3. A system as claimed in claim 1, wherein said disengagement control means is responsive to said detecting means and the potential at a start position contact of the ignition switch and outputs the disengagement control signal when the potential at the start position contact is high and the detection result of said detecting means indicates that the engine has stalled.

4. A system as claimed in claim 1, wherein said disengagement detecting means is a sensor for detecting whether an amount of operation of the clutch has exceeded a predetermined degree.

5. A system as claimed in claim 1, wherein said current control means comprises first means which is electrically connected between the start position contact of the ignition switch and the starter motor for controlling ON/OFF of the starting current flowing from the start position contact to the starter motor when the ignition switch is switched to the start position contact, second means responsive to said disengagement control means and said disengagement detecting means for producing a confirming signal indicating that the clutch has disengaged in response to the disengagement control signal, and third means responsive to the production of the confirming signal for operating said first means so as to allow the starting current to flow.

6. A system as claimed in claim 1 further comprising a discriminating means for discriminating whether or not one or more conditions prescribed as preconditions for allowing the engine to start in a case other than the case wherein the engine has stalled for a reason other than that the ignition switch has been turned off have been met, said current control means being controlled so as to allow the start current to flow when it is found by the discriminating means that the preconditions have been met.

7. A system as claimed in claim 6, wherein said discriminating means comprises a selected position detector for detecting a position selected by a selecting lever of a selector, and means responsive to the selected position detector and the ignition switch for determining that the preconditions have been met when the selecting lever is at a prescribed position and the ignition switch is in the start position.

* * * * *